US008943292B2

United States Patent
Ramaraju et al.

(10) Patent No.: US 8,943,292 B2
(45) Date of Patent: Jan. 27, 2015

(54) SYSTEM AND METHOD FOR MEMORY ARRAY ACCESS WITH FAST ADDRESS DECODER

(75) Inventors: Ravindraraj Ramaraju, Round Rock, TX (US); David R. Bearden, Austin, TX (US); Prashant U. Kenkare, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1282 days.

(21) Appl. No.: 11/552,817

(22) Filed: Oct. 25, 2006

(65) Prior Publication Data

US 2007/0094480 A1    Apr. 26, 2007

Related U.S. Application Data

(63) Continuation-in-part of application No. 11/257,932, filed on Oct. 25, 2005, now Pat. No. 7,669,034.

(51) Int. Cl.
*G06F 12/02* (2006.01)
*G06F 9/355* (2006.01)
*G06F 9/345* (2006.01)

(52) U.S. Cl.
CPC ............... *G06F 9/355* (2013.01); *G06F 9/345* (2013.01)
USPC .................................. 711/202; 711/E12.002

(58) Field of Classification Search
None
See application file for complete search history.

(56) References Cited

U.S. PATENT DOCUMENTS

| | | | | |
|---|---|---|---|---|
| 3,265,876 | A | * | 8/1966 | Lethin ........................... 708/685 |
| 5,754,819 | A | | 5/1998 | Lynch et al. |
| 6,813,628 | B2 | | 11/2004 | Bhushan et al. |
| 2003/0110198 | A1 | * | 6/2003 | Park .............................. 708/671 |
| 2004/0064674 | A1 | | 4/2004 | Asano et al. |
| 2005/0050278 | A1 | * | 3/2005 | Meier et al. ................... 711/128 |

OTHER PUBLICATIONS

PCT International Search Report and Written Opinion, PCT/US06/40017 dated Jul. 16, 2008.
Cortadella et al; "Evaluation of "A+B=K" Conditions without Carry Propagation"; IEEE Trans. on Computers, vol. 41, No. 11, Nov. 1992.
Cortadella et al; "Evaluating of "A+B=K" Conditions in Constant Time"; IEEE ISCAS, 1988.

(Continued)

*Primary Examiner* — Charles Rones
*Assistant Examiner* — Ryan Dare
(74) *Attorney, Agent, or Firm* — James L. Clingan, Jr.; Joanna G. Chiu

(57) ABSTRACT

A method includes storing a first transaction entry to a first software configurable storage location, storing a second transaction entry to a second software configurable storage location, determining that a first transaction indicated by the first transaction entry has occurred, determining that a second transaction indicated by the second transaction entry has occurred subsequent to the first transaction, and, in response to determining that the first transaction occurred and the second transaction occurred, storing at least one transaction attribute captured during at least one clock cycle subsequent to the second transaction. The first and second software configurable storage locations may be located in a trace buffer, where the at least one transaction attribute is stored to the trace buffer and overwrites the first and second transaction attributes. Each transaction entry may include a dead cycle field, a consecutive transaction requirement field, and a last entry field.

6 Claims, 16 Drawing Sheets

(56) References Cited

OTHER PUBLICATIONS

Y. Lee et al; "Address Addition and Decoding without Carry Propagation" IEICE Trans. Inf. & Syst. vol. E80-D, No. 1, Jan. 1997.

R. Heald et al; "64-Kbyte Sum-Addressed-Memory Cache with 1.6ns Cycle and 2.6ns Latency"; IEEE JSSC vol. 33, No. 11, Nov. 1998.

W. Lynch et al; "Low Load Latency through Sum-Addressed Memory(SAM)".

U.S. Appl. No. 11/257,932, Bearden, David, et al., "System and Method for Memory Array Access with Fast Address Decoder", filed on Oct. 25, 2005, Office Action—Rejection, May 1, 2008.

U.S. Appl. No. 11/257,932, Bearden, David, et al., "System and Method for Memory Array Access with Fast Address Decoder", filed on Oct. 25, 2005, Office Action—Rejection, Oct. 14, 2008.

* cited by examiner

SYSTEM AND METHOD FOR MEMORY ARRAY ACCESS WITH FAST ADDRESS DECODER

RELATED APPLICATIONS

This application is a continuation-in-part of U.S. patent application Ser. No. 11/257,932, titled "System and Method for Memory Array Access with Fast Address Decoder," filed Oct. 25, 2005, and assigned to the assignee hereof.

FIELD OF THE INVENTION

The present invention relates generally to the area of accessing memory. More particularly, the present invention relates to quickly selecting a wordline from a memory array in a case where an address is based on a combination of operands.

BACKGROUND OF THE INVENTION

Memory addressing in traditional processors is typically computed by adding two operands such as a base address and an offset address in order to arrive at an effective address. Base+offset addressing is typically used to address memory within data caches as well as data or instructions within other CPU memory units. For example, Table-Lookaside-Buffers (TLBs) typically use base+offset addition in order to access a buffer location within the TLB. Because an addition is typically performed to arrive at the effective address, traditional processors usually take at least two cycles to access the memory. A first cycle is used to add the base and offset addresses and a second cycle is used to access the memory. Consequently, because two cycles are usually needed to access the memory in a traditional processor, the cycle immediately following a load instruction cannot use the result of the load operation. This delay is referred to as "load latency." Load latency is a performance limitation factor in traditional processors. Load latency often manifests itself in a pipelined processor as a load-use penalty with the load results being unavailable for two machine cycles.

Therefore, what is needed is a system and method that improves access to a memory array based on multiple operand addressing.

BRIEF DESCRIPTION OF THE DRAWINGS

The foregoing and further and more specific objects and advantages of the invention will become readily apparent to those skilled in the art from the following detailed description of a preferred embodiment thereof taken in conjunction with the following drawings.

DETAILED DESCRIPTION OF THE INVENTION

In one aspect an address for accessing a data entry is obtained using the sum of two operands. In order to determine if data is present in the cache a TAG in the cache is accessed. Only a few bits of the address is for accessing the TAG. The corresponding bits from the two operands are directly used in initiating the accessing of the TAG rather than waiting for the complete sum of the two operands. The corresponding bits from the two operands are further divided into two subsets of bits. The subsets from each operand are input to a fast address decoder FADec to decode both the sum with a carry and the sum without a carry. The decode is accomplished for the case of a carry bit and the case without the carry bit because prior to the adding of the operands is completed the carry is not known. A further decode is provided based on the outputs of the FADecs. The sum of the operands then becomes available so that the proper entry in the memory is provided as the TAG. Thus, much of the activity required for providing the TAG is accomplished while the sum of the two operands is being calculated. This is better understood by reference to the drawings and the following description.

The following is intended to provide a detailed description of an example of the invention and should not be taken to be limiting of the invention itself. Rather, any number of variations may fall within the scope of the invention, which is defined in the claims following the description.

Figure 1:
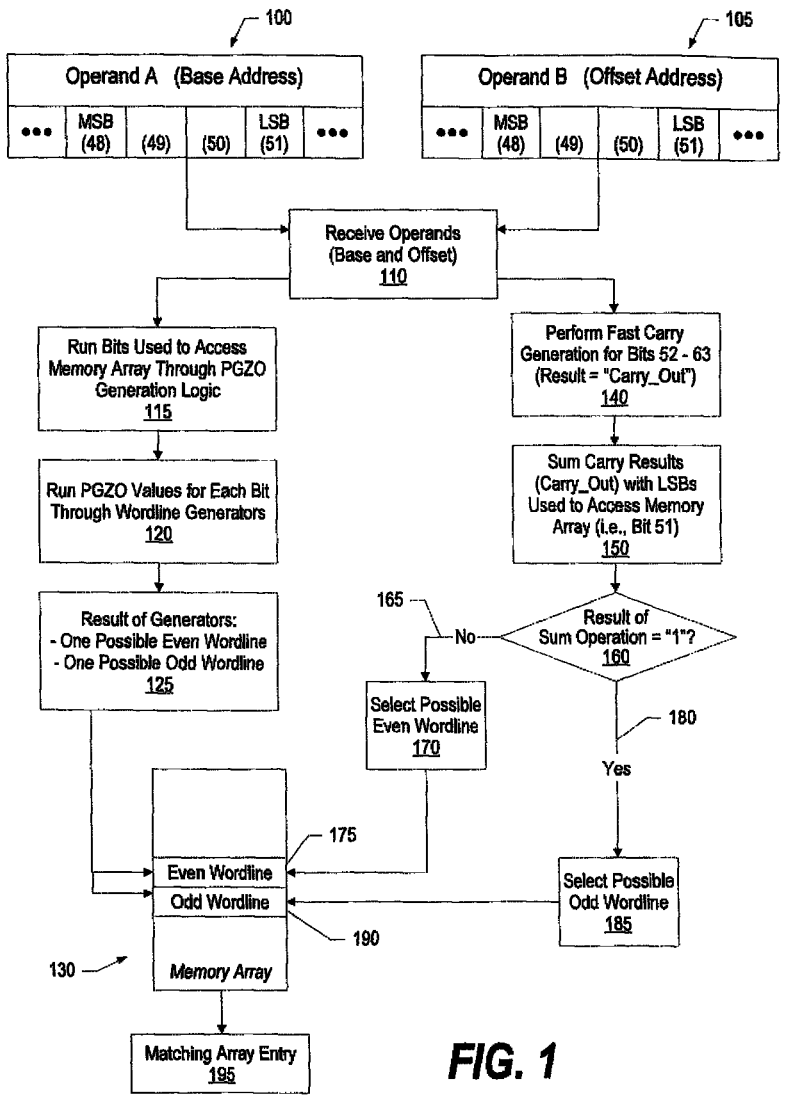
FIG. 1 is a high level flowchart showing the steps used in combining a base and offset to compute a word line from a memory array.

FIG. 1 is a high level flowchart showing the steps used in combining a base and offset to compute a word line from a memory array. Operand A (100) and operand B (105) each include a number of bits. In one embodiment, each operand includes 64 bits numbered 0 to 63. Some of the bits in the operand are used to address a memory entry in a memory array. In the example shown, four bits in the operands (bits 48 through 51) are used to address the memory entry. In the embodiment shown, one of the operands (Operand A) provides the "base" address and the other operand (Operand B) provides the "offset" address that are used to generate the "effective" address of the memory entry. In the embodiment shown, bit 48 is the most-significant-bit (MSB) and bit 51 is the least-significant bit (LSB). In other embodiments, the significance of the bits might be reversed so that the higher-numbered bit is more significant than the lower-numbered bit.

At step 110, the base and offset addresses (operands) are received. Two parallel processes commence at this point. One process evaluates the address bits (e.g., bits 48 through 51) to arrive at two possible wordlines (as used herein, a "wordline" is an address of an entry in the memory array or an actual memory array entry, as the context indicates). The other process determines if a carry results from bits in the operands (e.g., bits 52 through 63) and adds the carry value to the LSBs of the bits of the Operand A and B used to address the memory entry. The summation value determines which of the possible wordlines is the actual wordline.

The first parallel process commences at step 115 which runs the bits that are used to access the memory array (e.g., bits 48 through 51 for both Operands A and B) through PGZO generation logic. PGZO generation logic combines pairs of bits using logical operators (XOR, OR, AND, NAND) to create PGZO values. PGZO values are generated for the MSBs (bit 48 from both operands), bit 49 from both operands, bit 50 from both operands and from the LSBs (bit 51 from both operands). In the example shown, four bits are provided from the base and offset to generate a four bit effective address. Therefore, in the example shown, the effective address can be used to access a memory entry from a sixteen entry memory array. In step 120, the PGZO values for the various pairs of bits are run through wordline generators (see FIGS. 7 and 8 for an embodiment of wordline generators). Multiple copies of the wordline generators are used depending on the size of the memory array being accessed. In the sixteen-entry memory array shown in the example, sixteen copies of the wordline generators are used (eight copies of the generator depicted in FIG. 7 and eight copies of the generator depicted in FIG. 8). Each of the generators takes the PGZO values as inputs and results whether a particular address in the memory array is a possibility. At step 125, the results of the wordline generators is received. In the embodiment shown, the results of running the PGZO values through the wordline generators is one possible even wordline (with 0 being considered an even wordline, i.e., 0, 2, 4, 6, 8, 10, 12, and 14) and one possible odd wordline (i.e., 1, 3, 5, 7, 9, 11, 13, 15). In the example shown, even wordline 175 and odd wordline 190 have been identified as the possible wordlines within memory array 130. The following is intended to provide a detailed description of an example of the invention and should not be taken to be limiting of the invention itself. Rather, any number of variations may fall within the scope of the invention, which is defined in the claims following the description.

FIG. 1 is a high level flowchart showing the steps used in combining a base and offset to compute a word line from a memory array. Operand A (100) and operand B (105) each include a number of bits. In one embodiment, each operand includes 64 bits numbered 0 to 63. Some of the bits in the operand are used to address a memory entry in a memory array. In the example shown, four bits in the operands (bits 48 through 51) are used to address the memory entry. In the embodiment shown, one of the operands (Operand A) provides the "base" address and the other operand (Operand B) provides the "offset" address that are used to generate the "effective" address of the memory entry. In the embodiment shown, bit 48 is the most-significant-bit (MSB) and bit 51 is the least-significant bit (LSB). In other embodiments, the significance of the bits might be reversed so that the higher-numbered bit is more significant than the lower-numbered bit.

At step 110, the base and offset addresses (operands) are received. Two parallel processes commence at this point. One process evaluates the address bits (e.g., bits 48 through 51) to arrive at two possible wordlines (as used herein, a "wordline" is an address of an entry in the memory array or an actual memory array entry, as the context indicates). The other process determines if a carry results from bits in the operands (e.g., bits 52 through 63) and adds the carry value to the LSBs of the bits of the Operand A and B used to address the memory entry. The summation value determines which of the possible wordlines is the actual wordline.

The first parallel process commences at step 115 which runs the bits that are used to access the memory array (e.g., bits 48 through 51 for both Operands A and B) through PGZO generation logic. PGZO generation logic combines pairs of bits using logical operators (XOR, OR, AND, NAND) to create PGZO values. PGZO values are generated for the MSBs (bit 48 from both operands), bit 49 from both operands, bit 50 from both operands and from the LSBs (bit 51 from both operands). In the example shown, four bits are provided from the base and offset to generate a four bit effective address. Therefore, in the example shown, the effective address can be used to access a memory entry from a sixteen entry memory array. In step 120, the PGZO values for the various pairs of bits are run through wordline generators (see FIGS. 7 and 8 for an embodiment of wordline generators). Multiple copies of the wordline generators are used depending on the size of the memory array being accessed. In the sixteen-entry memory array shown in the example, sixteen copies of the wordline generators are used (eight copies of the generator depicted in FIG. 7 and eight copies of the generator depicted in FIG. 8). Each of the generators takes the PGZO values as inputs and results whether a particular address in the memory array is a possibility. At step 125, the results of the wordline generators is received. In the embodiment shown, the results of running the PGZO values through the wordline generators is one possible even wordline (with 0 being considered an even wordline, i.e., 0, 2, 4, 6, 8, 10, 12, and 14) and one possible odd wordline (i.e., 1, 3, 5, 7, 9, 11, 13, 15). In the example shown, even wordline 175 and odd wordline 190 have been identified as the possible wordlines within memory array 130.

In the embodiment shown, the reason that there are two wordline possibilities is because there may be a carry resulting from the bits that are less significant than the LSB used in the address. In the embodiment shown, the bits that are less significant are bits 52 through 63 for both operands A and B. The second parallel process is used to determine whether the odd or even wordline is the correct wordline from memory array 130. Steps 140 and 150 take place in parallel with steps 115 and 120. In step 140, a fast carry generation is performed for bits 52 through 63 for both operands A and B. In step 150, the carry out value generated in step 140 is summed (added) to the least-significant-bits (LSBs) of the Operands A and B. A determination is made as to whether the sum operation results in a "1" or a "0" (decision 160). If the sum operation results in a "0," decision 160 branches to "no" branch 165 whereupon, at step 170, even possible wordline 175 is selected. On the other hand, if the sum operation results in a "1," then decision 160 branches to "yes" branch 180 whereupon, at step 185, odd possible wordline 190 is selected. At step 195, the selected wordline is retrieved from memory array 130.

Figure 2:
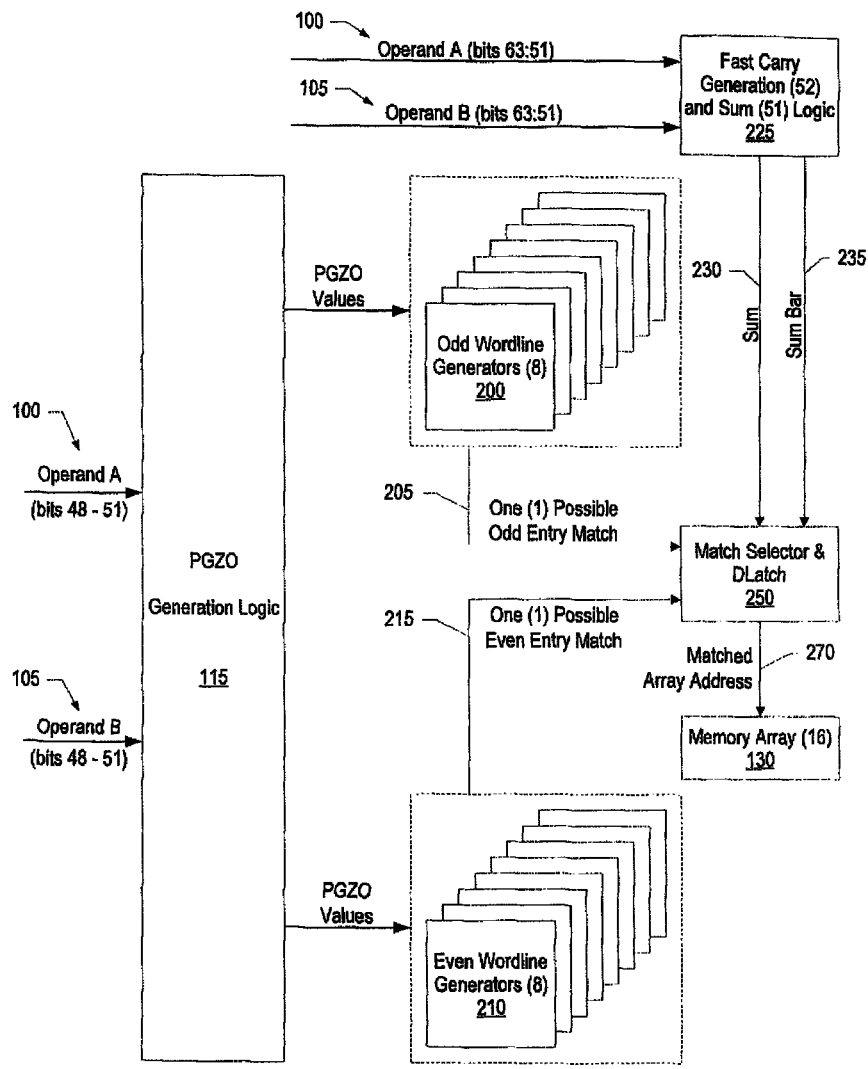
FIG. 2 is a diagram showing various components used in computing the word line from the base and offset.

FIG. 2 is a diagram showing various components used in computing the word line from the base and offset operands. Bits 48-51 (the memory array address bits) are provided to PGZO generation logic 115 for both Operand A (100) and Operand B (105). The resulting PGZO values are provided to copies of wordline generators. Eight odd wordline generators (200) are used to process PGZO values resulting in one possible odd memory array address (205). In addition, eight even wordline generators (210) are used to process PGZO values resulting in one possible even memory array address (215).

In parallel with PGZO generation logic 115 and wordline generators 200 and 210, fast carry generation logic is performed on bits 52 through 63 and the carry value is added to the LSB of the memory address bits of the Operands A and B. This results in sum value 230 which is either '0' or '1,' and sum bar 235 which is the opposite of the sum value ('1' if sum is '0', '0' if sum is '1').

Match selector and DLatch 250 selects either the possible odd memory array entry address (205) or the possible even memory array entry address (215) depending on the value of sum and sum bar. The selected memory array address (270) is then retrieved from memory array 130.

Figure 3:
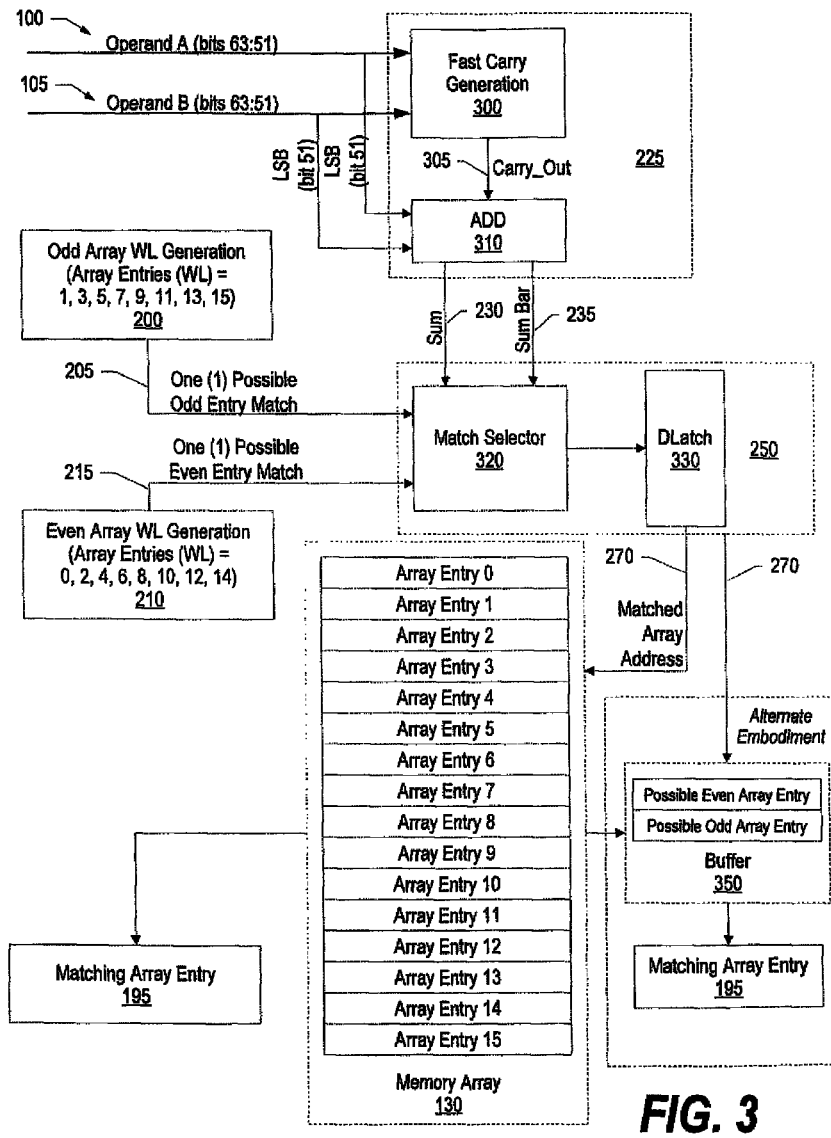
FIG. 3 is a diagram showing a match selector and a latch being used to select the word line.

FIG. 3 is a diagram showing a match selector and a latch being used to select the word line. FIG. 3 is similar to FIG. 2, however FIG. 3 shows additional detail regarding fast carry generation and sum logic 225 as well as match selector and Dlatch 250.

Fast carry generation and sum logic 225 includes fast carry generation circuitry 300 that receives less significant bits from Operands A and B (bits 51-63) and generates carry out value 305. Fast carry generation and sum logic 225 also includes addition circuitry 310 that adds the least significant address bit (LSB bit 51) from Operand A, the least significant address bit (LSB bit 51) from Operand B, and the carry out value to generate sum 230 and sum bar 235.

Match selector and Dlatch circuitry 250 includes match selector circuitry 320 which receives the possible odd and even memory array entry wordlines (205 and 215) along with sum 230 and sum bar 235 and selects one wordline. Dlatch circuitry 330 operates to latch a memory array wordline corresponding to the selected memory array entry address from memory array 130, resulting in matching memory array entry 195. Memory array 130 may be a TLB, a data cache or an instruction cache. Matching memory array entry 195, therefore, may be a data or instruction used by a process or processed by a processor.

In an alternate embodiment, the two possible wordline entries corresponding to odd memory array entry wordline 205 and even memory array entry wordline entry 215 are retrieved from memory array 130 and stored in a separate buffer (buffer 350) prior to the latching operation. This embodiment may be used when the possible wordline entries (205 and 215) are identified before sum 230 and sum bar 235 are provided by sum logic 225. In this embodiment, latch circuitry 330 operates to latch one of the two memory array entries that have been stored in buffer 350 resulting in matching memory array entry 195.

Figure 4:
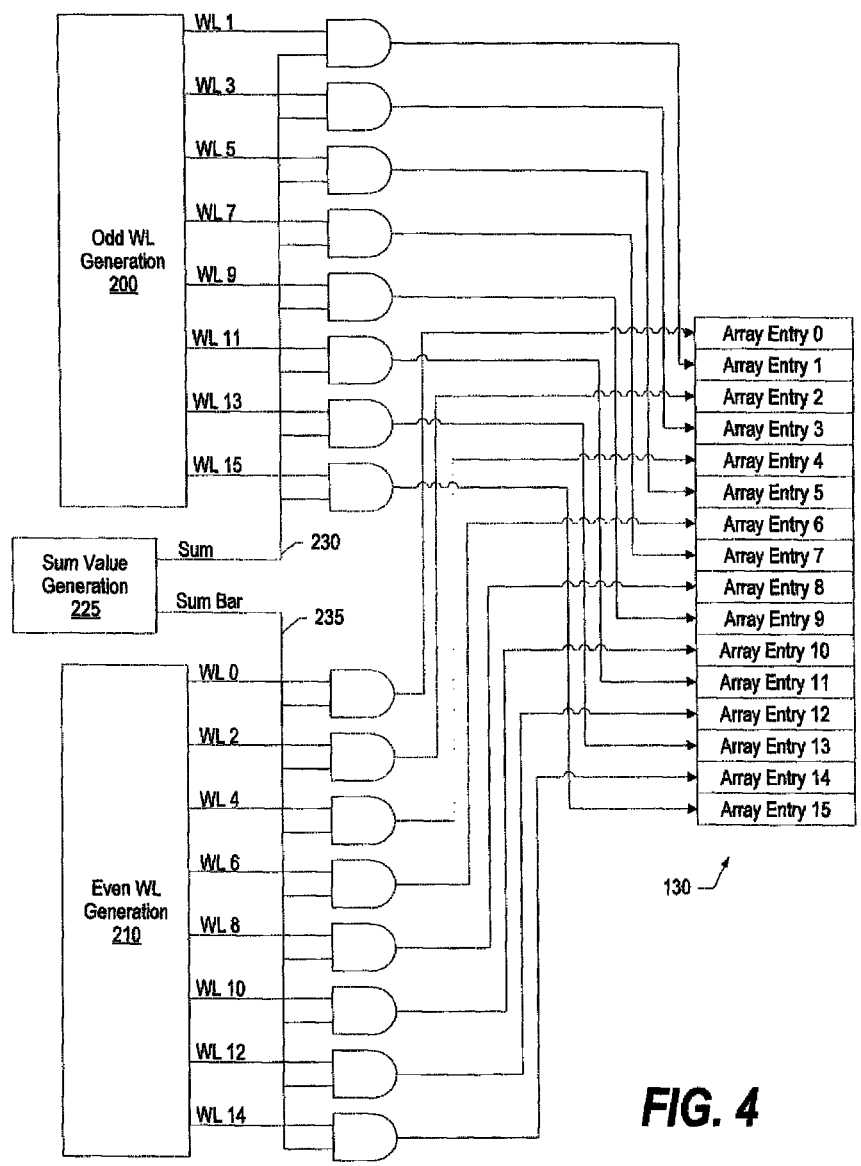
FIG. 4 is a diagram showing possible word lines being logically combined with a sum value to select two possible word lines after PGZO values have been computed.

FIG. 4 is a diagram showing possible word lines being logically combined with a sum value to select two possible word lines after PGZO values have been computed. Wordline generators 200 generate possible wordlines for the entries in memory array 130 with odd addresses and wordline generators 210 generate possible wordlines for the entries in memory array 130 with even addresses. As result of running the PGZO values through the wordline generators, one of the odd wordlines (WL 1, 3, 5, 7, 9, 11, 13, or 15) will be enabled and one of the even wordlines will be enabled (WL 0, 2, 4, 6, 8, 10, 12, or 14). As used herein, "WL" is an abbreviation for "wordline." Sum value generation 225 creates sum value 230 and sum bar 235. As described in FIG. 2, sum bar is the opposite of sum so if sum is enabled then sum bar is not enabled, and vise versa.

Sum 230 is ANDed with each of the possible odd wordlines and sum bar 235 is ANDed with each of the possible even wordlines. In other words, both the wordline and the sum or sum bar have to be enabled in order for the signal to access one of the array entries within memory array 130. For example, assume that the possible odd wordline is WL 7 and the possible even wordline is WL 6. If sum is enabled (i.e., '1'), then sum bar would be '0' and the result of the AND operations would result in WL 7 being selected (both WL 7 and sum are enabled) and WL 6 would not be selected (WL 6 being enabled but sum bar not being enabled). On the other hand, if sum bar is enabled, then the opposite result would occur: both WL 6 and sum bar would be enabled so the result of the AND operations would propagate the WL 6 signal to memory array 130, and WL 7 would not propagate because while WL 7 is enabled, sum would not be enabled.

Figure 5:
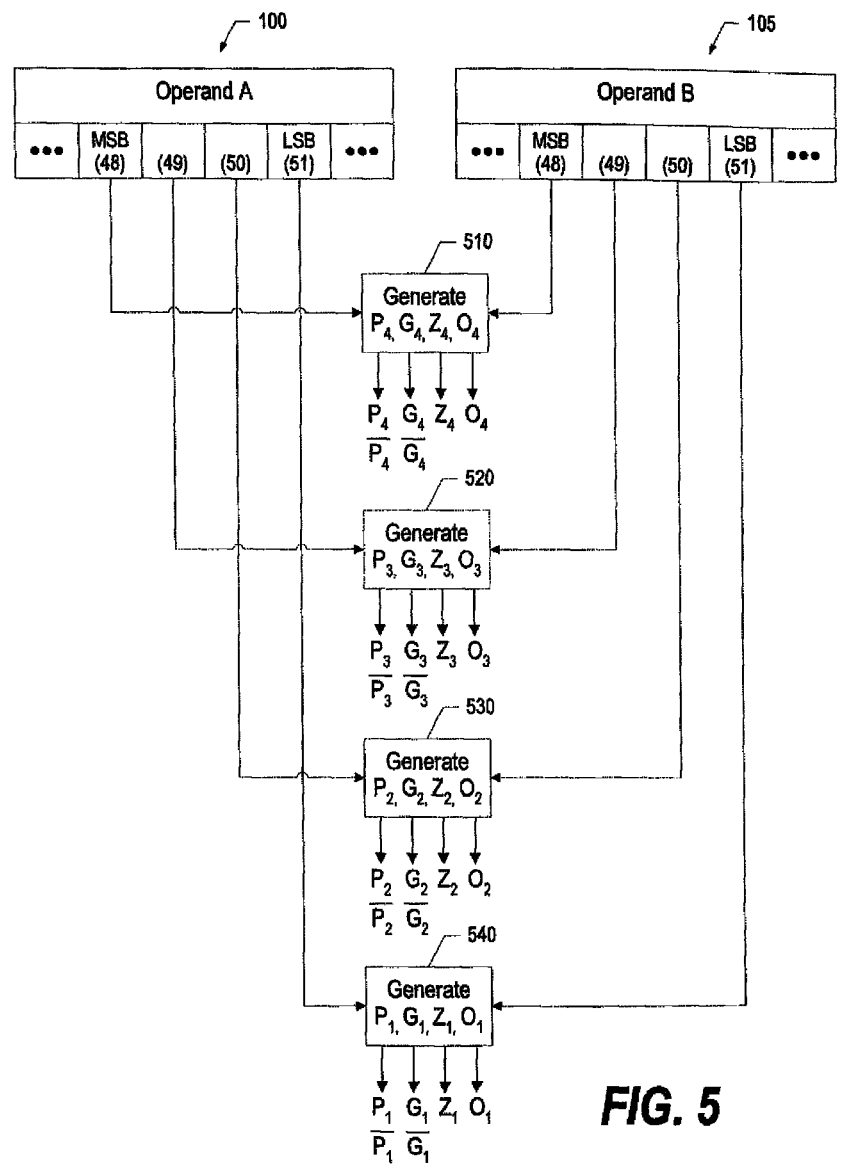
FIG. 5 is a diagram illustrating bits from the base and offset being combined to form PGZO values.

FIG. 5 is a diagram illustrating bits from the base and offset being combined to form PGZO values. PGZO generation block 510 receives the MSB from both Operands A and B (bit 48). PGZO generation block 520 receives bit 49 from both Operands A and B. PGZO generation block 530 receives bit 50 from both Operands A and B. Finally, PGZO generation block 540 receives the LSB from both Operands A and B (bit 51). The example shown addresses a sixteen-entry memory array. Additional or fewer PGZO generation blocks would be used to compute the PGZO values for more or less bits used to address larger or smaller memory arrays.

The result of each of the PGZO generations is a P value (by XORing the inputs), a G value (by ANDing the inputs), a Z value (by ANDing the inverted inputs), and an O value (by ORing the inputs). In addition, a P bar value and a G bar value are generated, with P bar being the inverse of the XOR value (by XNORing the inputs), and with G bar being the inverse of the AND value (by NANDing the inputs). As used herein, "PGZO" refers to one or more values generated by XORing bits, XNORing bits, ANDing bits, NANDing bits, ORing bits, and ANDing inverted bit values. Each logical operation may not be performed for every pair of bits. As input to the wordline generators shown in FIGS. 7 and 8, the specific mappings of PGZO values provided as inputs to the wordline generators are shown in FIGS. 10-13.

Figure 6:
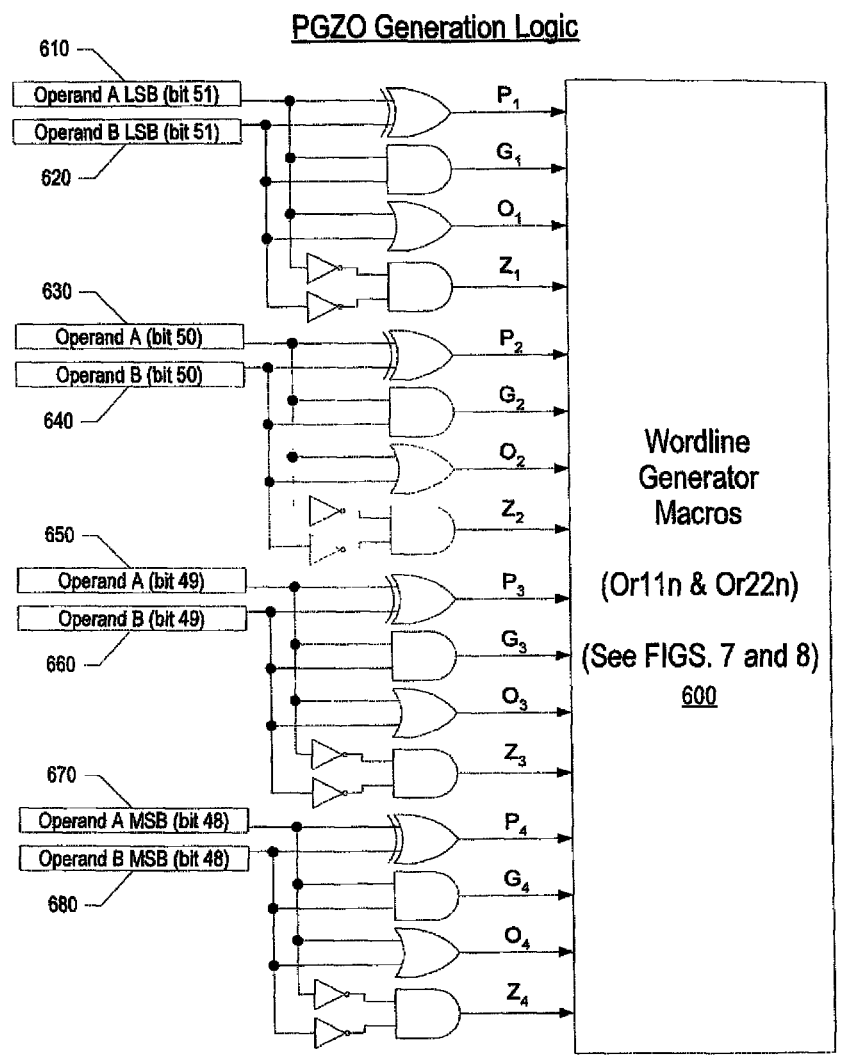
FIG. 6 is a diagram illustrating logical operations performed on various bits from the base and offset to produce PGZO values.

FIG. 6 is a diagram illustrating logical operations performed on various bits from the base and offset to produce PGZO values. The LSB from Operand A (610) is combined with the LSB from Operand B (620) by XORing, XNORing, ANDing, NANDing, ORing, and ANDing the inverted values. These values are provided as inputs to Wordline Generators 600. Likewise, PGZO values are generated using bits 50 from Operand A and B (630 and 640) and these values are provided as inputs to Wordline Generators 600. Similarly, PGZO values are generated using bits 49 from Operand A and B (650 and 660) and these values are provided as inputs to Wordline Generators 600. Finally, PGZO values are generated using the MSBs (bits 48) from Operand A and B (670 and 680) and these values are provided as inputs to Wordline Generators 600. While not shown in FIG. 6, XNOR and NAND values are also generated by inverting the XOR and AND logical values for each of the pairs of input bits. For specific mappings of the various PGZO values to wordline generators 600, see FIGS. 10-13. For the circuitry used in the wordline generators, see FIGS. 7 and 8.

Figure 7:
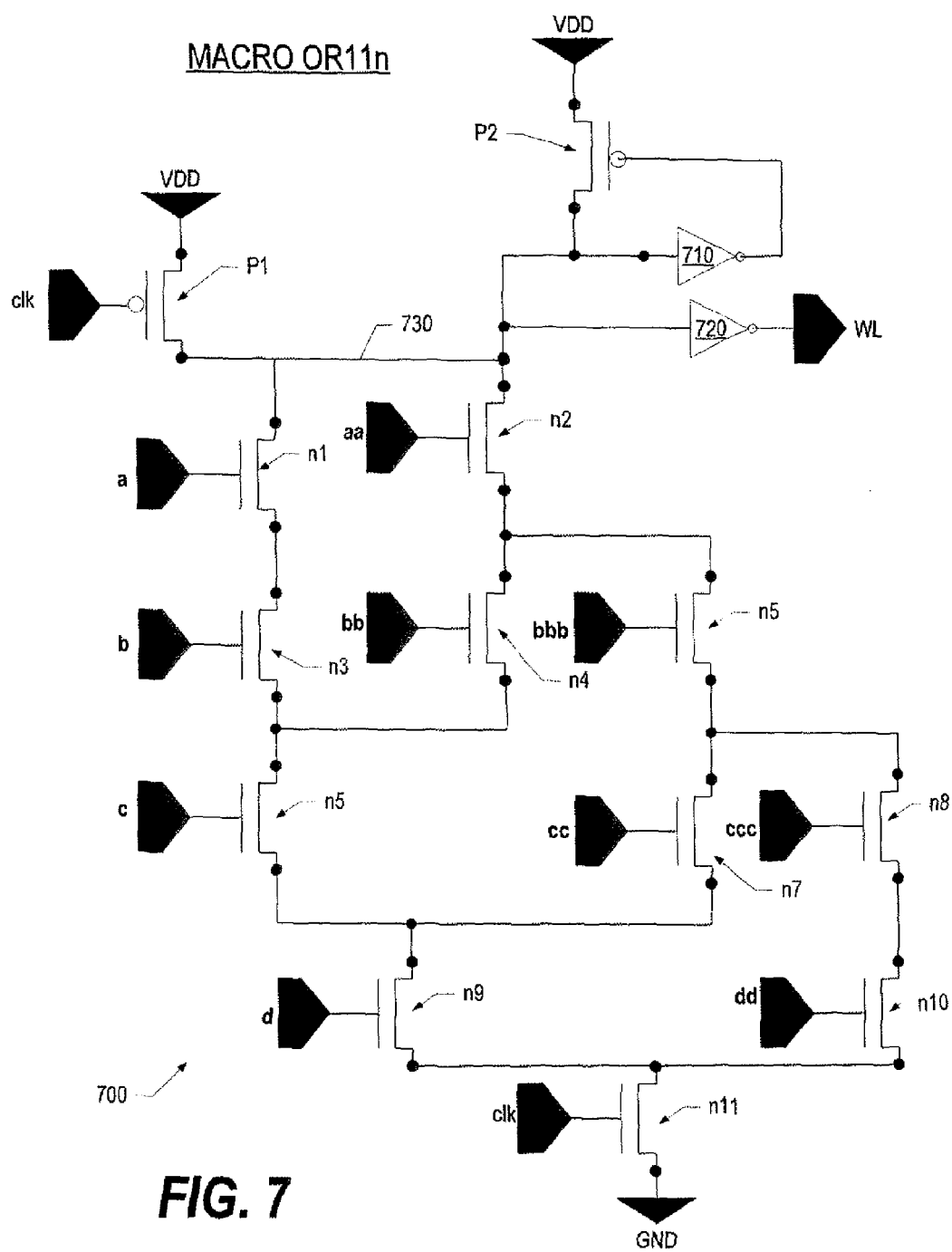
FIGS. 7 and 8 are diagrams showing two circuits used to generate the array word lines.
Figure 8:
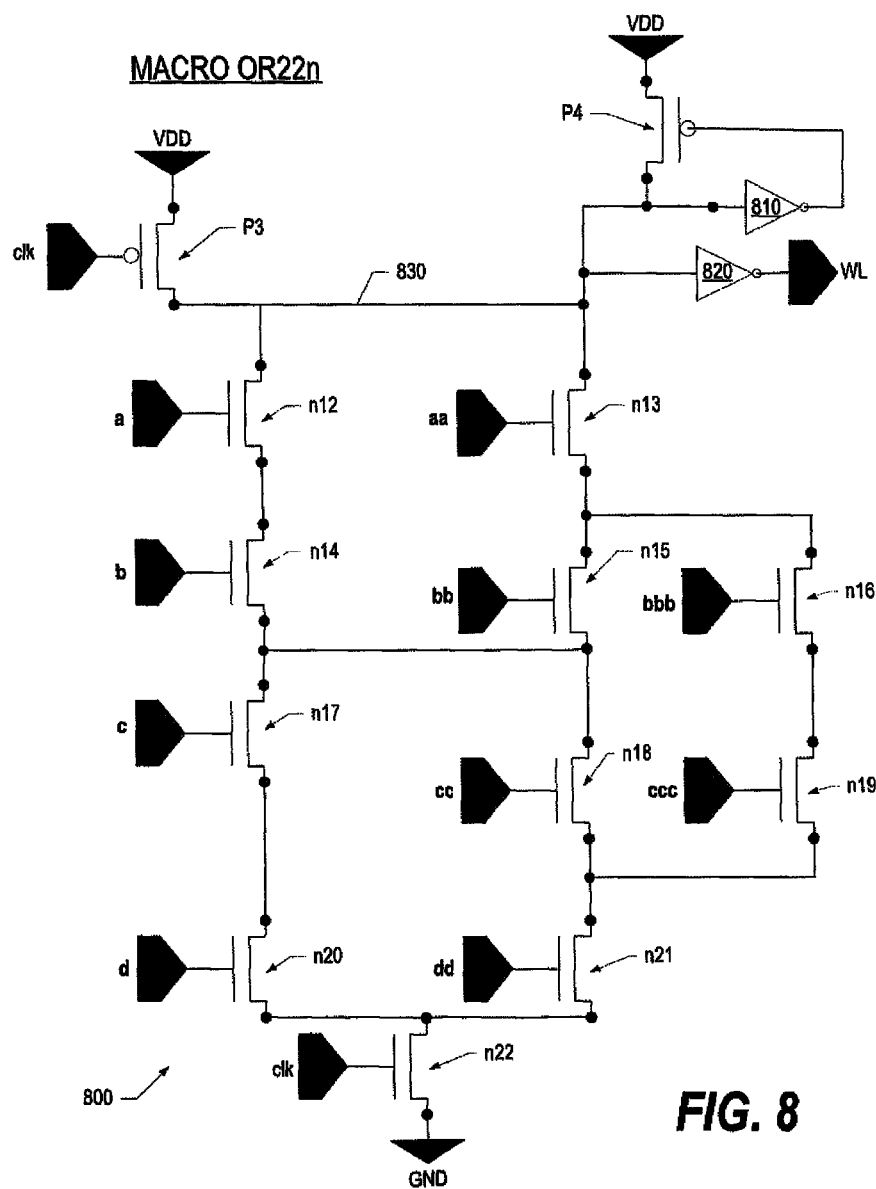

FIG. 7 and FIG. 8 show the circuits used to generate the array word lines. The circuits are referred to as "macros," "wordline generators," and "wordline generator macros." Macro Or11n is the wordline generator depicted in FIG. 7. In FIG. 7, a first clocked circuit to generate a word line is illustrated. The clocked circuit is controlled by clk clock pin. When clk is low, the circuit is in the precharge state and output WL is low. When clk is high, the circuit is in the evaluate state. The output WL now depends on the inputs a, aa, b, bb, bbb, c, cc, ccc, d and dd. The inputs at the same level of the NMOS stack are mutually exclusive. Inputs at the same level of the NMOS stack are also called an "input set." That is the first set of inputs a and aa are mutually exclusive products of the most significant bit (MSB). The second set of inputs b, bb and bbb are mutually exclusive products of the second most significant bit (MSB-1). The third set of inputs c, cc and ccc are mutually exclusive products of the second least significant bit (LSB+1). The fourth set of inputs d and dd are mutually exclusive products of the least significant bit (LSB).

The NMOS n1 and n2 are in the top level of the NMOS stacks. Either n1 or n2 would be ON depending the inputs a and aa. Similarly, the NMOS n3, n4 and n5 are at the same level below the top level of the NMOS stacks. Only one of n3, n4 and n5 would be ON depending on the inputs b, bb and bbb. The NMOS n6, n7 and n8 are in the middle level of the NMOS stack. Only one of n6, n7 and n8 would be ON depending on the inputs c, cc and ccc.

The NMOS n9 and n10 are in the lower level of the NMOS stack. Either n9 or n10 would be ON depending on the inputs d and dd. Therefore, during the time when clk is high, there are two possibilities. Depending upon the inputs, a conductive path from the precharged node 730 to the ground GND may discharge the precharged node to 730 to LOW. The input of the inverter 720 connected to the precharged node drives a HIGH to the output WL. The input of the inverter 710 which is also connected to the precharged node 730 drives a HIGH to PMOS p2 and turning OFF the PMOS p2. Alternatively, when there is no conductive path from the precharged node 730 to ground GND, the precharged node 730 remains the precharged state. The keeper PMOS p2 actively keeps the precharged node 730 at the precharge state.

In FIG. 8, a second clocked circuit to generate a word line is illustrated. Macro Or22n is the wordline generator depicted in FIG. 8. The clocked circuit is controlled by the clock clk pin. When clk is low, the circuit is in the precharge state and output WL is low. When clk is high, the circuit is in the evaluate state. The output WL now depends on the inputs a, aa, b, bb, bbb, c, cc, ccc, d and dd. The inputs at the same level of the NMOS stack are mutually exclusive. That is the first set of inputs a and aa are mutually exclusive products of the most significant bit (MSB). The second set of inputs b, bb and bbb are mutually exclusive products of the second most significant bit (MSB−1). The third set of inputs c, cc and ccc are mutually exclusive products of the second least significant bit (LSB+1). The fourth set of inputs d and dd are mutually exclusive products of the least significant bit (LSB).

The NMOS n12 and n13 are in the top level of the NMOS stacks. Either n12 or n13 would be ON depending the inputs a and aa. Similarly, the NMOS n14, n15 and n16 are at the same level below the top level of the NMOS stacks. Only one of n14, n15 and n16 would be ON depending on the inputs b, bb and bbb. The NMOS n17, n18 and n19 are in the middle level of the NMOS stack. Only one of n17, n18 and n19 would be ON depending on the inputs c, cc and ccc. The NMOS n20 and n21 are in the lower level of the NMOS stack. Either n20 or n21 would be ON depending on the inputs d and dd. Therefore, during the time when clk is high, there are two possibilities. Depending upon the inputs, a conductive path from the precharged node 830 to the ground GND may discharge the precharged node to 830 to LOW. The input of the inverter 820 connected to the precharged node drives a HIGH to the output WL. The input of the inverter 710 which is also connected to the precharged node 830 drives a HIGH to PMOS p4 and turning OFF the PMOS p4. Alternatively, when there is no conductive path from the precharged node 830 to ground GND, the precharged node 830 remains the precharged state. The keeper PMOS p4 actively keeps the precharged node 830 at the precharge state.

Figure 9:
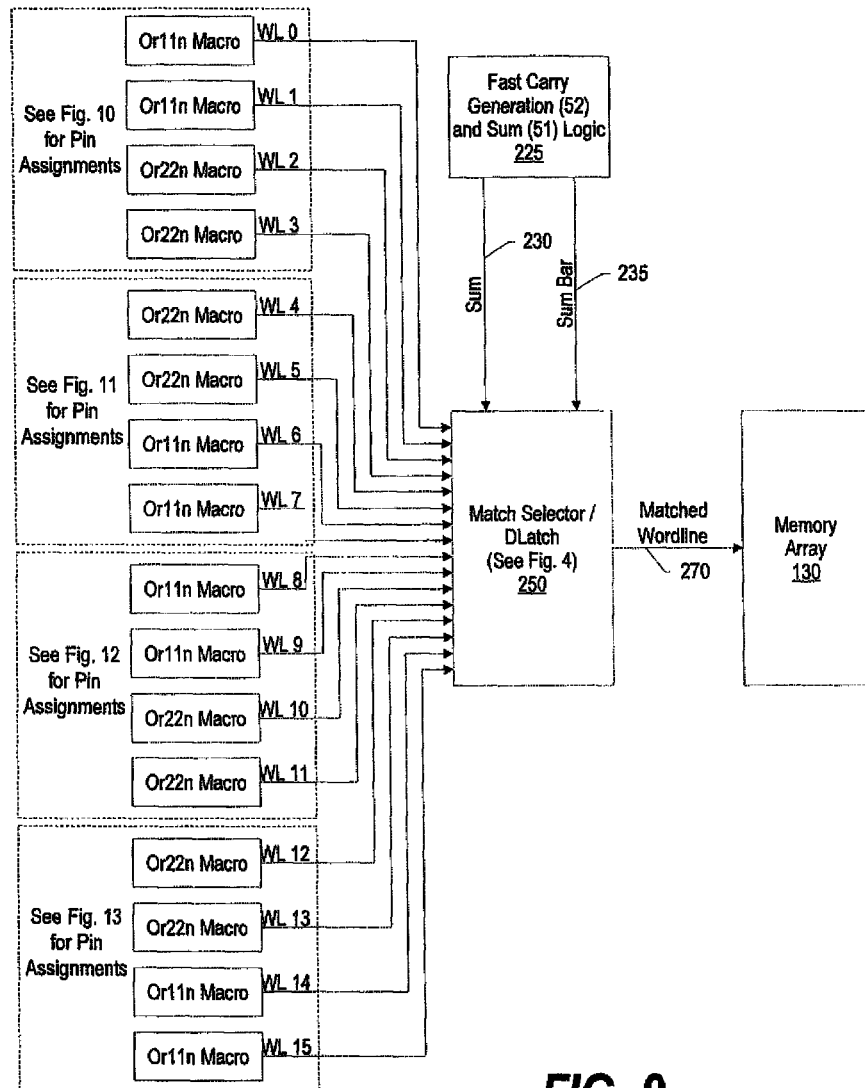
FIG. 9 is a diagram showing which of the macros is used to generate specific word lines and the match selector/latch used to compute the actual word line.

FIG. 9 is a diagram showing which of the macros is used to generate specific word lines and the match selector/latch used to compute the actual word line. The placement and groupings of the macros shown in FIG. 9 is not meant to indicate actual hardware placement or grouping of the wordline generators shown in FIGS. 7 and 8.

Two wordline generators are depicted in FIGS. 7 and 8. The wordline generator shown in 7 is referred to as the "OR11n" macro and the wordline generator shown in FIG. 8 is referred to as the "OR22n" macro. By mapping PGZO inputs to the various wordline generators, the wordline generators output whether a particular wordline is "possible" based upon the PGZO inputs. When PGZO values are generated for four address bits of two operands and run through the wordline generators as shown in FIG. 9, two possible wordlines result (an odd-addressed wordline and an even-addressed wordline).

In the embodiment shown, a sixteen entry memory array is used. Larger or smaller memory arrays could be used according to the teachings provided herein. To determine if the first memory entry is a possibility (WL 0), PGZO inputs are provided to the Or11n wordline generator (see FIG. 7 and corresponding description for a description of the Or11n wordline generator and see FIG. 10 and corresponding description for input mappings that show how the PGZO values map to the Or11n inputs). Likewise, to determine if the second memory entry is a possibility (WL 1), PGZO inputs are provided to the Or11n wordline generator (see FIG. 7 and corresponding description for a description of the Or11n wordline generator and see FIG. 10 and corresponding description for input mappings that show how the PGZO values map to the Or11n inputs).

Figure 10:
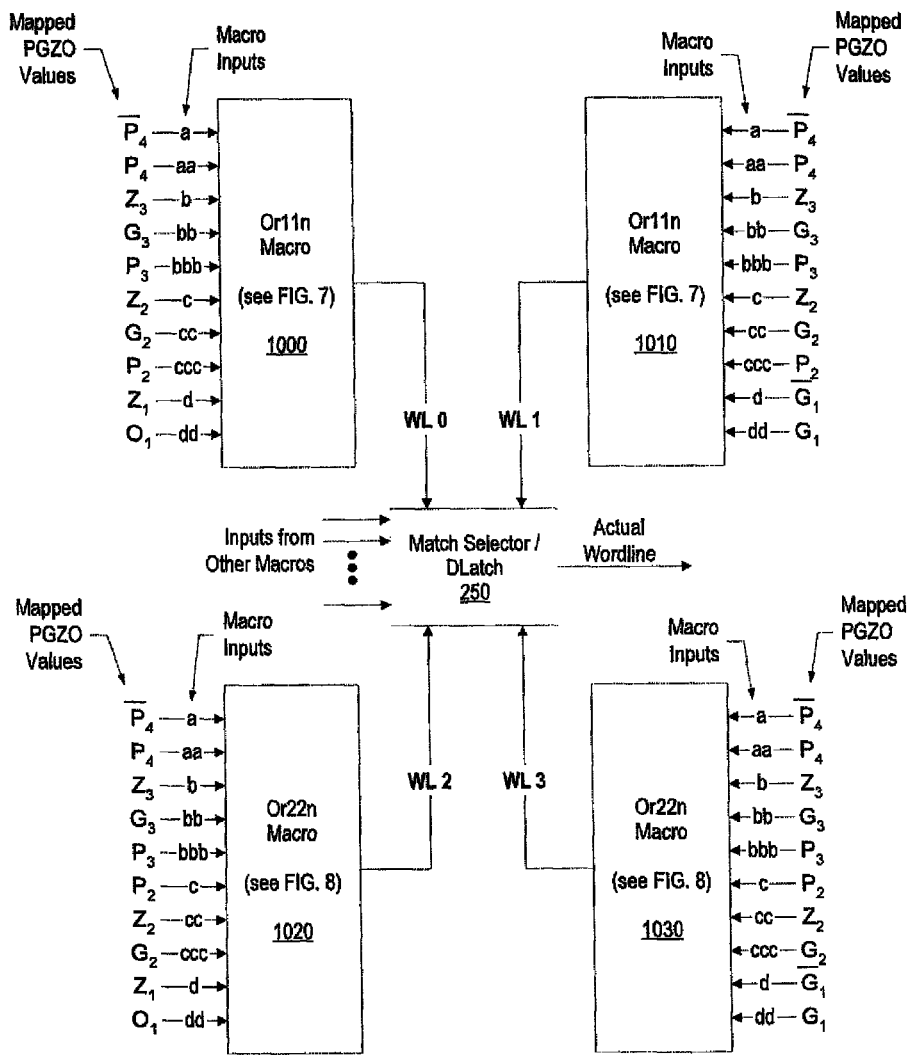
FIGS. 10-13 detail the pin assignments mapping the PGZO values to the macros to compute each of the word lines.

In order to determine if the third memory entry is a possibility (WL 2), PGZO inputs are provided to the Or22n wordline generator (see FIG. 8 and corresponding description for a description of the Or22n wordline generator and see FIG. 10 and corresponding description for input mappings that show how the PGZO values map to the Or22n inputs). Likewise, to determine if the fourth memory entry is a possibility (WL 3), PGZO inputs are provided to the Or22n wordline generator (see FIG. 8 and corresponding description for a description of the Or22n wordline generator and see FIG. 10 and corresponding description for input mappings that show how the PGZO values map to the Or22n inputs).

Figure 11:
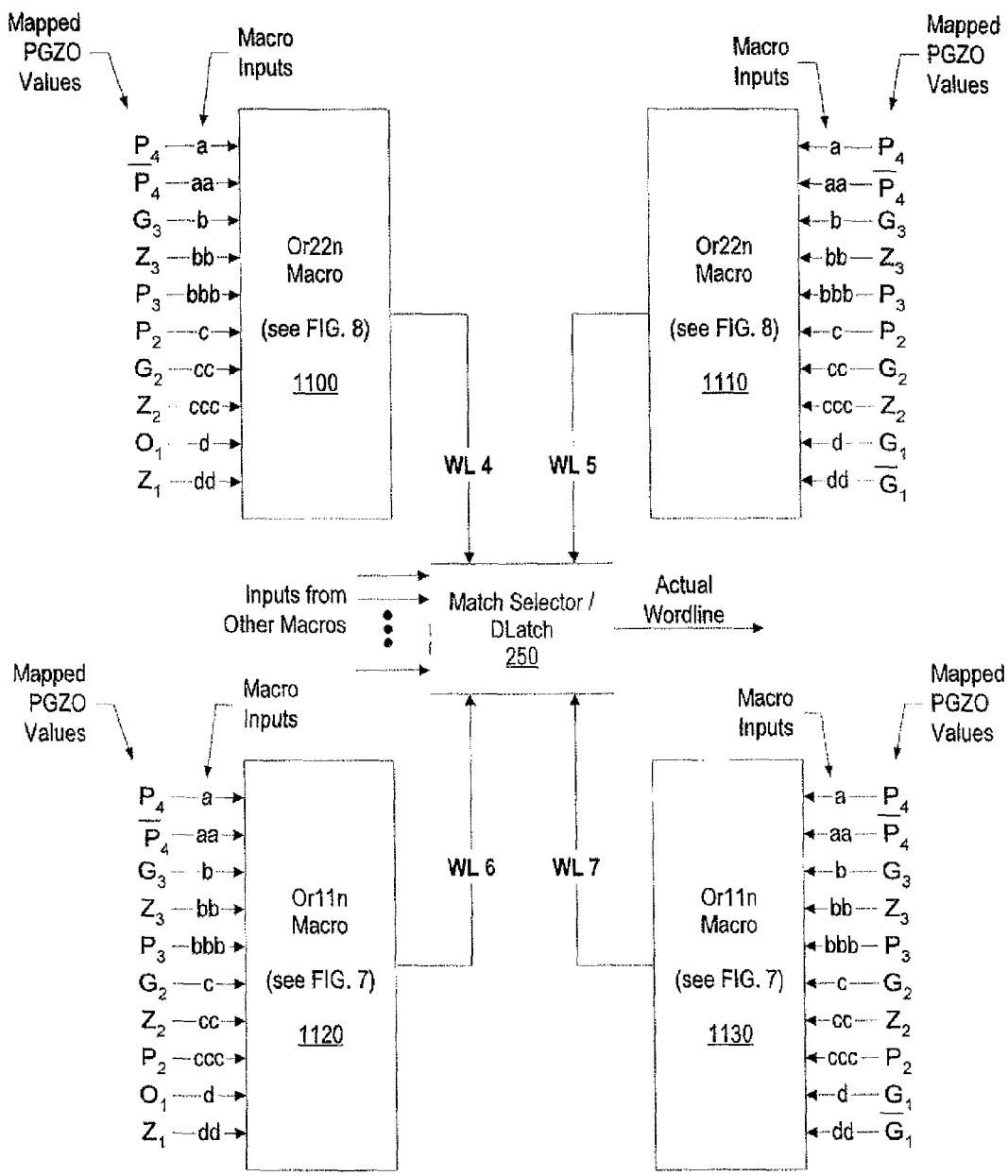

In order to determine if the fifth memory entry is a possibility (WL 4), PGZO inputs are provided to the Or22n wordline generator (see FIG. 8 and corresponding description for a description of the Or22n wordline generator and see FIG. 11 and corresponding description for input mappings that show how the PGZO values map to the Or22n inputs). Likewise, to determine if the sixth memory entry is a possibility (WL 5), PGZO inputs are provided to the Or22n wordline generator (see FIG. 8 and corresponding description for a description of the Or22n wordline generator and see FIG. 11 and corresponding description for input mappings that show how the PGZO values map to the Or22n inputs).

To determine if the seventh memory entry is a possibility (WL 6), PGZO inputs are provided to the Or11n wordline generator (see FIG. 7 and corresponding description for a description of the Or11n wordline generator and see FIG. 11 and corresponding description for input mappings that show how the PGZO values map to the Or11n inputs). Likewise, to determine if the eighth memory entry is a possibility (WL 7), PGZO inputs are provided to the Or11n wordline generator (see FIG. 7 and corresponding description for a description of the Or11n wordline generator and see FIG. 11 and corresponding description for input mappings that show how the PGZO values map to the Or11n inputs).

Figure 12:
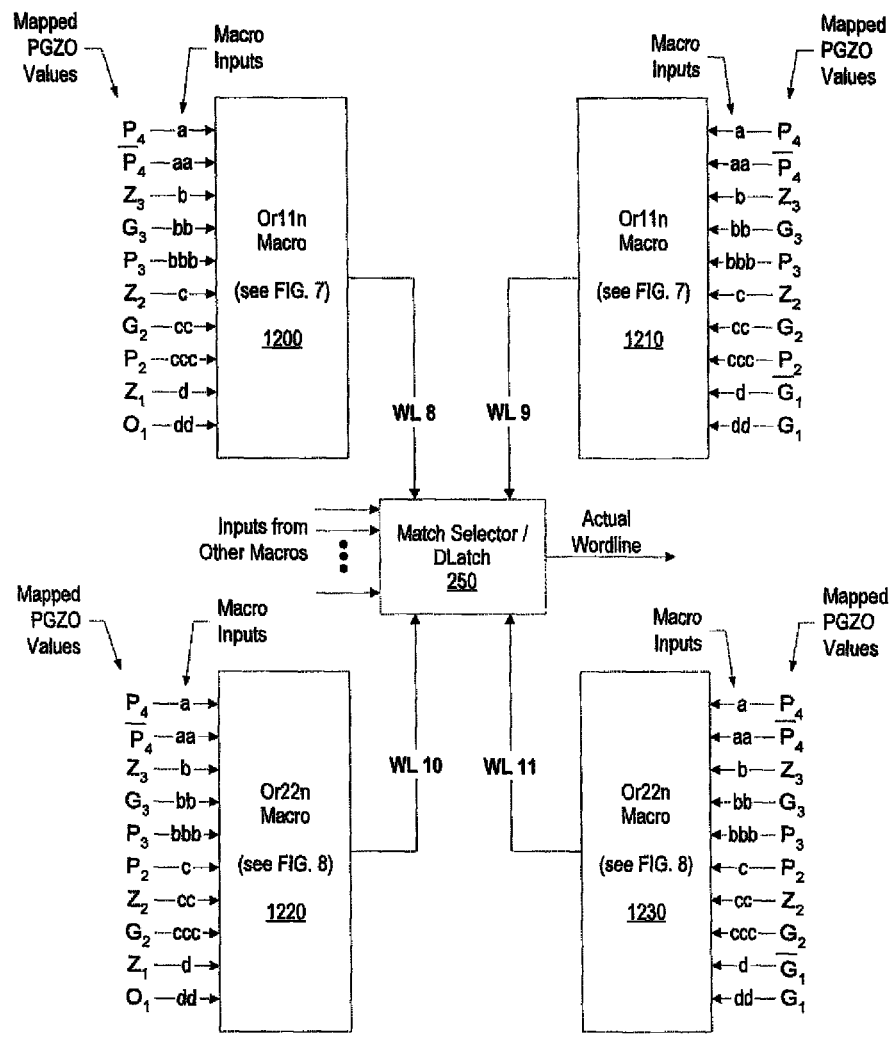

To determine if the ninth memory entry is a possibility (WL 8), PGZO inputs are provided to the Or11n wordline generator (see FIG. 7 and corresponding description for a description of the Or11n wordline generator and see FIG. 12 and corresponding description for input mappings that show how the PGZO values map to the Or11n inputs). Likewise, to determine if the tenth memory entry is a possibility (WL 9), PGZO inputs are provided to the Or11n wordline generator (see FIG. 7 and corresponding description for a description of the Or11n wordline generator and see FIG. 12 and corresponding description for input mappings that show how the PGZO values map to the Or11n inputs).

In order to determine if the eleventh memory entry is a possibility (WL 10), PGZO inputs are provided to the Or22n wordline generator (see FIG. 8 and corresponding description for a description of the Or22n wordline generator and see FIG. 12 and corresponding description for input mappings that show how the PGZO values map to the Or22n inputs). Likewise, to determine if the twelfth memory entry is a possibility (WL 11), PGZO inputs are provided to the Or22n wordline generator (see FIG. 8 and corresponding description for a description of the Or22n wordline generator and see FIG. 12 and corresponding description for input mappings that show how the PGZO values map to the Or22n inputs).

Figure 13:
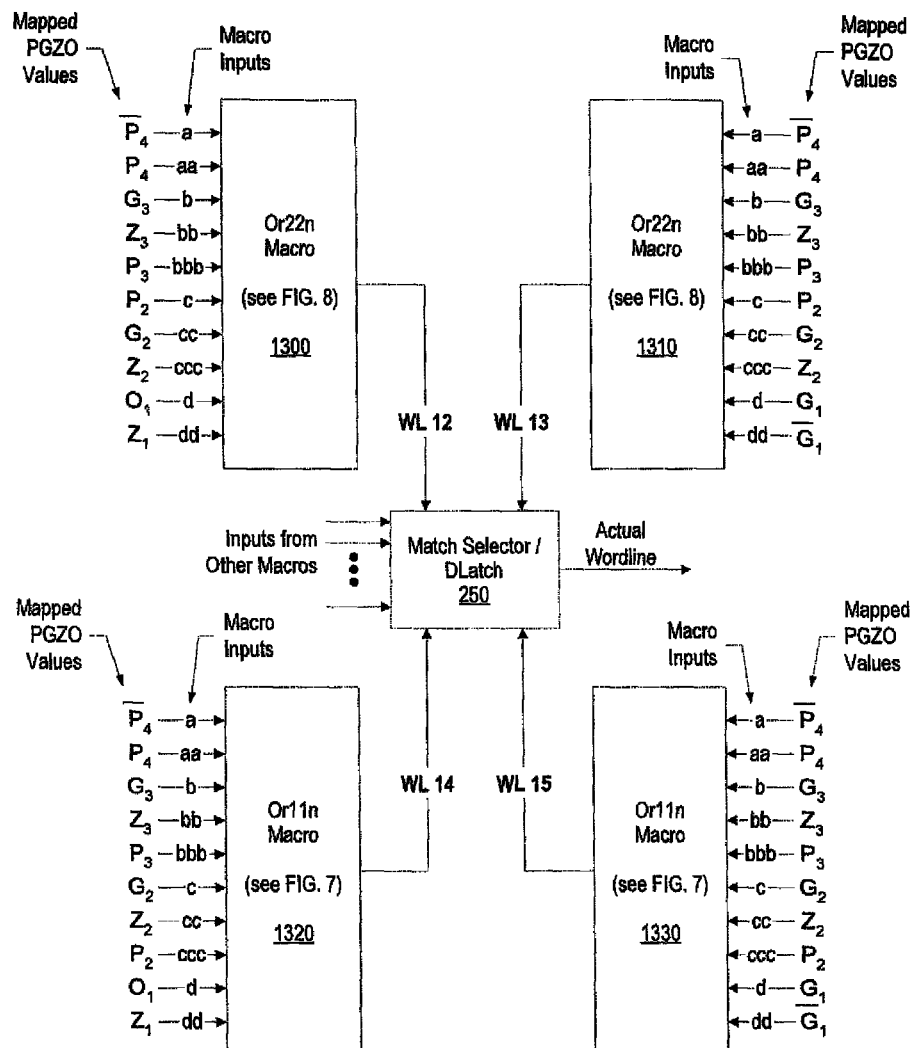

In order to determine if the thirteenth memory entry is a possibility (WL 12), PGZO inputs are provided to the Or22n wordline generator (see FIG. 8 and corresponding description for a description of the Or22n wordline generator and see FIG. 13 and corresponding description for input mappings that show how the PGZO values map to the Or22n inputs). Likewise, to determine if the fourteenth memory entry is a possibility (WL 13), PGZO inputs are provided to the Or22n wordline generator (see FIG. 8 and corresponding description for a description of the Or22n wordline generator and see FIG. 13 and corresponding description for input mappings that show how the PGZO values map to the Or22n inputs).

Finally, to determine if the fifteenth memory entry is a possibility (WL 14), PGZO inputs are provided to the Or11n wordline generator (see FIG. 7 and corresponding description for a description of the Or11n wordline generator and see FIG. 13 and corresponding description for input mappings that show how the PGZO values map to the Or11n inputs). Likewise, to determine if the sixteenth memory entry is a possibility (WL 15), PGZO inputs are provided to the Or11n wordline generator (see FIG. 7 and corresponding description for a description of the Or11n wordline generator and see FIG. 13 and corresponding description for input mappings that show how the PGZO values map to the Or11n inputs).

As a result of the PGZO values being mapped and supplied to the wordline generators as described above, two possible wordlines will be ON and will provide input to match selector/Dlatch circuitry 250. In addition, circuitry 235 receives sum and sum bar from fast carry generation and sum logic 225. In one embodiment, shown in FIG. 4, the sum value is ANDed with the odd possible wordlines (WLs 1, 3, 5, 7, 9, 11, 13, and 15) and the sum bar value is ANDed with the even possible wordlines (WLs 0, 2, 4, 6, 8, 10, 12, and 14). Because only one of the sum or sum bar will be ON, only one of the two wordlines will propagate as matched wordline 270 which will be used to access the corresponding entry in memory array 130.

FIGS. 10-13 detail the pin assignments mapping the PGZO values to the wordline generators to compute each of the word lines. The wordline generators (Or11n and Or22n) shown in FIGS. 7 and 8 have a variety of inputs labeled a, aa, b, bb, bbb, c, cc, ccc, d, and dd. Depending upon the possible wordline being generated by the wordline generator, different PGZO values are mapped to the wordline inputs. In order to compute possible wordlines for a sixteen entry memory array, sixteen wordline generators are used—eight wordline generators Or11n (depicted in FIG. 7) and eight wordline generators Or22n (depicted in FIG. 8).

The subscript next to each P, G, Z, or O value indicates which bit pairing is used to generate the respective value, with '1' being the LSB and '4' being the MSB. In addition, a line over a P, G, Z, or O indicates that the inverse of the logic function is provided as input. For example, a $P_4$ indicates that the input is a result of an XOR of the MSBs (i.e., bit 48 from Operands A and B). Likewise, a $G_3$ indicates that the input is a result of an AND of bit 49 from Operands A and B. A $Z_2$ indicates that the input is a result of an AND of the inverted bit values of bit 50 from Operands A and B. An $O_1$ indicates that the input is a result of an OR of the LSBs (bit 51 from Operands A and B).

FIG. 10 details the mappings of the PGZO values to the input pins of wordline generators Or11n and Or22n to determine whether WL 0, 1, 2, or 3 are possibilities. FIG. 11 details the mappings of the PGZO values to the input pins of wordline generators Or11n and Or22n to determine whether WL 4, 5, 6, or 7 are possibilities. Similarly, FIG. 12 details the mappings of the PGZO values to the input pins of wordline generators Or11n and Or22n to determine whether WL 8, 9, 10, or 11 are possibilities. Finally, FIG. 13 details the mappings of the PGZO values to the input pins of wordline generators Or11n and Or22n to determine whether WL 12, 13, 14, or 15 are possibilities.

The tables below detail the inputs shown in FIGS. 10-13. The term "MSB−1" is used to denote the next bit after the MSB (i.e., bit 49) and "LSB+1" is used to denote the bit before the LSB (i.e., bit 50).

To determine whether WL 0 is a possibility, a copy of the Or11n wordline generator is used (see FIG. 7). Copy 1000 of wordline generator Or11n shown in FIG. 10 uses the following mapping of PGZO values:

| Macro Input (see FIG. 7) | PGZO Value Mapped to Input |
|---|---|
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | AND of inverted LSB + 1 |
| cc | AND of MSB − 1 |
| ccc | XOR of LSB + 1 |
| d | AND of inverted LSB |
| dd | OR of LSB |

To determine whether WL 1 is a possibility, a copy of the Or11n wordline generator is used (see FIG. 7). Copy 1010 of wordline generator Or11n shown in FIG. 10 uses the following mapping of PGZO values:

| Macro Input (see FIG. 7) | PGZO Value Mapped to Input |
|---|---|
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | AND of inverted LSB + 1 |
| cc | AND of MSB − 1 |
| ccc | XOR of LSB + 1 |
| d | Inverted AND (NAND) of LSB |
| dd | AND of LSB |

To determine whether WL 2 is a possibility, a copy of the Or22n wordline generator is used (see FIG. 8). Copy 1020 of wordline generator Or22n shown in FIG. 10 uses the following mapping of PGZO values:

| Macro Input (see FIG. 8) | PGZO Value Mapped to Input |
|---|---|
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | AND of inverted LSB |
| dd | OR of LSB |

To determine whether WL 3 is a possibility, a copy of the Or22n wordline generator is used (see FIG. 8). Copy 1030 of wordline generator Or22n shown in FIG. 10 uses the following mapping of PGZO values:

| Macro Input (see FIG. 8) | PGZO Value Mapped to Input |
|---|---|
| a | Exclusive NOR (XNOR) of MSB |
| aa | Exclusive OR (XOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | Inverted AND (NAND) of LSB |
| dd | AND of LSB |

Turning to FIG. 11, in order to determine whether WL 4 is a possibility, a copy of the Or22n wordline generator is used (see FIG. 8). Copy 1100 of wordline generator Or22n shown in FIG. 11 uses the following mapping of PGZO values:

| Macro Input (see FIG. 8) | PGZO Value Mapped to Input |
|---|---|
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | OR of LSB |
| dd | AND of inverted LSB |

To determine whether WL 5 is a possibility, a copy of the Or22n wordline generator is used (see FIG. 8). Copy 1110 of wordline generator Or22n shown in FIG. 11 uses the following mapping of PGZO values:

| Macro Input (see FIG. 8) | PGZO Value Mapped to Input |
|---|---|
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |

-continued

| Macro Input (see FIG. 8) | PGZO Value Mapped to Input |
|---|---|
| ccc | AND of inverted LSB + 1 |
| d | AND of LSB |
| dd | Inverted AND (NAND) of LSB |

To determine whether WL 6 is a possibility, a copy of the Or11n wordline generator is used (see FIG. 7). Copy 1120 of wordline generator Or11n shown in FIG. 11 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | OR of LSB |
| dd | AND of inverted LSB |

To determine whether WL 7 is a possibility, a copy of the Or11n wordline generator is used (see FIG. 7). Copy 1130 of wordline generator Or11n shown in FIG. 11 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | AND of LSB |
| dd | Inverted AND (NAND) of LSB |

Turning to FIG. 12, in order to determine whether WL 8 is a possibility, a copy of the Or11n wordline generator is used (see FIG. 7). Copy 1200 of wordline generator Or11n shown in FIG. 12 uses the following mapping of PGZO values:

| Macro Input (see FIG. 7) | PGZO Value Mapped to Input |
|---|---|
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | AND of inverted LSB + 1 |
| cc | AND of LSB + 1 |
| ccc | XOR of LSB + 1 |
| d | AND of inverted LSB |
| dd | OR of LSB |

To determine whether WL 9 is a possibility, a copy of the Or11n wordline generator is used (see FIG. 7). Copy 1210 of wordline generator Or11n shown in FIG. 12 uses the following mapping of PGZO values:

| Macro Input (see FIG. 7) | PGZO Value Mapped to Input |
| --- | --- |
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | AND of inverted LSB + 1 |
| cc | AND of LSB + 1 |
| ccc | XOR of LSB + 1 |
| d | Inverted AND (NAND) of LSB |
| dd | AND of LSB |

To determine whether WL 10 is a possibility, a copy of the Or22n wordline generator is used (see FIG. 8). Copy 1220 of wordline generator Or22n shown in FIG. 12 uses the following mapping of PGZO values:

| Macro Input (see FIG. 8) | PGZO Value Mapped to Input |
| --- | --- |
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | AND of inverted LSB |
| dd | OR of LSB |

To determine whether WL 11 is a possibility, a copy of the Or22n wordline generator is used (see FIG. 8). Copy 1230 of wordline generator Or22n shown in FIG. 12 uses the following mapping of PGZO values:

| Macro Input (see FIG. 8) | PGZO Value Mapped to Input |
| --- | --- |
| a | Exclusive OR (XOR) of MSB |
| aa | Exclusive NOR (XNOR) of MSB |
| b | AND of inverted MSB − 1 |
| bb | AND of MSB − 1 |
| bbb | XOR of MSB − 1 |
| c | XOR of LSB + 1 |
| cc | AND of inverted LSB + 1 |
| ccc | AND of LSB + 1 |
| d | Inverted AND of LSB |
| dd | AND of LSB |

Turning to FIG. 13, in order to determine whether WL 12 is a possibility, a copy of the Or22n wordline generator is used (see FIG. 8). Copy 1300 of wordline generator Or22n shown in FIG. 13 uses the following mapping of PGZO values:

| Macro Input (see FIG. 8) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | OR of LSB |
| dd | AND of inverted LSB |

To determine whether WL 13 is a possibility, a copy of the Or22n wordline generator is used (see FIG. 8). Copy 1310 of wordline generator Or22n shown in FIG. 13 uses the following mapping of PGZO values:

| Macro Input (see FIG. 8) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | XOR of LSB + 1 |
| cc | AND of LSB + 1 |
| ccc | AND of inverted LSB + 1 |
| d | AND of LSB |
| dd | Inverted AND (NAND) of LSB |

To determine whether WL 14 is a possibility, a copy of the Or11n wordline generator is used (see FIG. 7). Copy 1320 of wordline generator Or11n shown in FIG. 13 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | OR of LSB |
| dd | AND of inverted LSB |

Finally, in order to determine whether WL 15 is a possibility, a copy of the Or11n wordline generator is used (see FIG. 7). Copy 1330 of wordline generator Or11n shown in FIG. 13 uses the following mapping of PGZO values:

| Macro Input (see FIG. 7) | PGZO Value Mapped to Input |
| --- | --- |
| a | Exclusive NOR (XNOR) of MSB |
| aa | Exclusive OR (XOR) of MSB |
| b | AND of MSB − 1 |
| bb | AND of inverted MSB − 1 |
| bbb | XOR of MSB − 1 |
| c | AND of LSB + 1 |
| cc | AND of inverted LSB + 1 |
| ccc | XOR of LSB + 1 |
| d | AND of LSB |
| dd | Inverted AND (NAND) of LSB |

Figure 14:
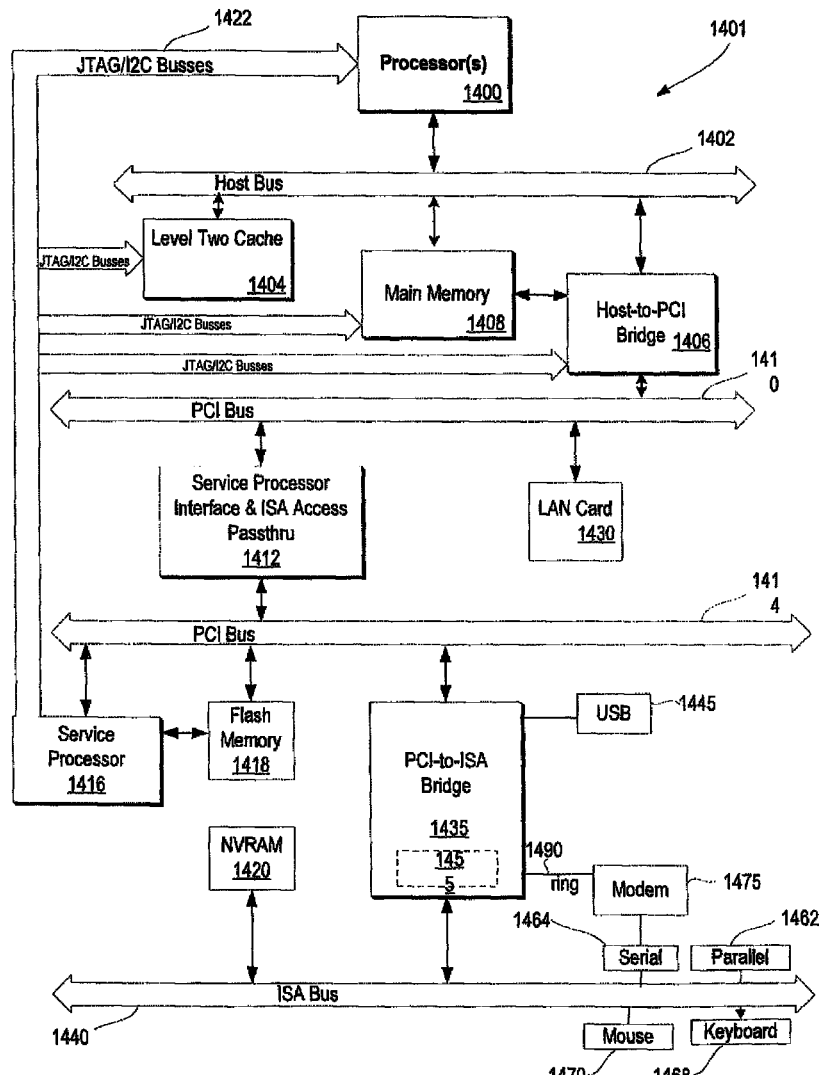
FIG. 14 is a block diagram of a data processing system in which a preferred embodiment of the present invention may be implemented.

FIG. 14 illustrates information handling system 1401 which is a simplified example of a computer system capable of performing the computing operations of the host computer described herein with respect to a preferred embodiment of the present invention. Computer system 1401 includes processor 1400 which is coupled to host bus 1402. A level two (L2) cache memory 1404 is also coupled to host bus 1402. Host-to-PCI bridge 1406 is coupled to main memory 1408, includes cache memory and main memory control functions, and provides bus control to handle transfers among PCI bus 1410, processor 1400, L2 cache 1404, main memory 1408, and host bus 1402. Main memory 1408 is coupled to Host-to-PCI bridge 1406 as well as host bus 1402. Devices used solely by host processor(s) 1400, such as LAN card 1430, are coupled to PCI bus 1410. Service Processor Interface and ISA Access Pass-through 1412 provide an interface between PCI bus 1410 and PCI bus 1414. In this manner, PCI bus 1414 is insulated from PCI bus 1410. Devices, such as flash memory 1418, are coupled to PCI bus 1414. In one implementation, flash memory 1418 includes BIOS code that incorporates the necessary processor executable code for a variety of low-level system functions and system boot functions.

PCI bus 1414 provides an interface for a variety of devices that are shared by host processor(s) 1400 and Service Processor 1416 including, for example, flash memory 1418. PCI-to-ISA bridge 1435 provides bus control to handle transfers between PCI bus 1414 and ISA bus 1440, universal serial bus (USB) functionality 1445, power management functionality 1455, and can include other functional elements not shown, such as a real-time clock (RTC), DMA control, interrupt support, and system management bus support.

Nonvolatile RAM 1420 is attached to ISA Bus 1440. Service Processor 1416 includes JTAG and I2C buses 1422 for communication with processor(s) 1400 during initialization steps. JTAG/I2C buses 1422 are also coupled to L2 cache 1404, Host-to-PCI bridge 1406, and main memory 1408 providing a communications path between the processor, the Service Processor, the L2 cache, the Host-to-PCI bridge, and the main memory. Service Processor 1416 also has access to system power resources for powering down information handling device 1401.

Peripheral devices and input/output (I/O) devices can be attached to various interfaces (e.g., parallel interface 1462, serial interface 1464, keyboard interface 1468, and mouse interface 1470 coupled to ISA bus 1440. Alternatively, many I/O devices can be accommodated by a super I/O controller (not shown) attached to ISA bus 1440.

In order to attach computer system 1401 to another computer system to copy files over a network, LAN card 1430 is coupled to PCI bus 1410. Similarly, to connect computer system 1401 to an ISP to connect to the Internet using a telephone line connection, modem 1475 is connected to serial port 1464 and PCI-to-ISA Bridge 1435.

While the computer system described in FIG. 14 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconFIG.d by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

Figure 15:
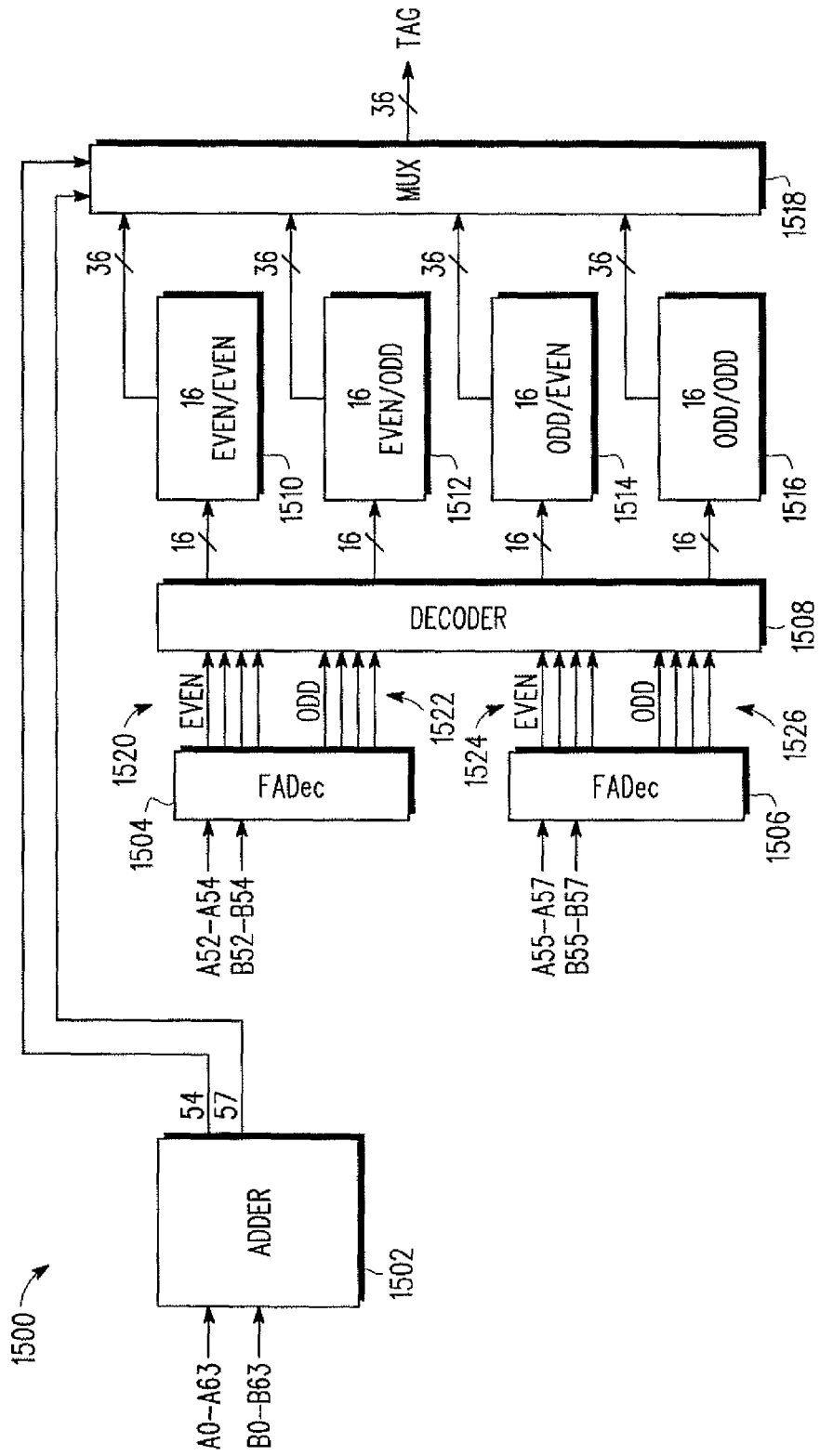
FIG. 15 is a block diagram of one alternative embodiment.

Shown in FIG. 15 is a TAG memory 1500 comprising an adder 1502, a fast address decoder (FADec) 1504, a FADec 1506, a decoder 1508, a memory array 1510, a memory array 1512, a memory array 1514, a memory array 1516, and a multiplexer 1518. In the example, adder 1502 receives two 64 bit operands A0-63 and B0-63. The sum of these is what constitutes the full address that is used for the address for a location in main memory. The data may also be present in a cache. TAG memory 1500 is useful in making that determination by providing the TAG from one of memory arrays 1510, 1512, 1514, and 1516 for the cache. Adder 1502 is thus useful in TAG memory 1500 but is also used by other circuitry used in performing a memory access. Each of FADecs 1504 and 1506 are made and operate in the same manner as the combination of PGZO 115 and wordline generators 200 and 210 as shown in FIG. 2. The difference is that wordline generators 200 and 210 are responding to four bits and thus together have a total of 16 outputs; 8 odd from wordline generator 200 and 8 even from wordline generator 210. FADec 1504 receives only three bits and thus provides 8 outputs; four even bits 1520 and four odd bits 1522. Similary FADec 1506 receives only three bits and thus provides 8 outputs; four even bits 1524 and four odd bits 1526. Decoder 1508 has a total of 16 inputs for receiving the 16 outputs from FADecs 1504 and 1506; 8 from each. Decoder 1508 has 64 outputs, 16 each coupled to memory wordlines of arrays 1510, 1512, 1514, and 1516, which each provide an output of 36 bits. Multiplexer 1518 is coupled to the outputs of memory arrays 1510, 1512, 1514, and 1516 and provides one of those outputs as a 36 bit TAG output of TAG 1500.

In operation FADec 1504 receives three bits A52-A54 from operand A and three bits B52-B54 from operand B and provides an active output on one of the four even bits 1520 and one of the four odd bits 1522. Similary, FADec 1506 receives three bits A55-A57 from operand A and three bits B55-B57 from operand B and provides an active output on one of the four even bits 1524 and one of the four odd bits 1526. In this example of six bits 52-57, bits 55-57 are the least significant bits (lsb) and bits 52-54 are the most significant bits (msb). The two active lines in even bits 1520 and 1522 indicate the two possible selected values based on having a carry bit and not having a carry bit. Thus, the lower value is the decode of the partial sum of bits A52-A54 and B52-B54 without a carry bit, which can also be stated as a carry of zero. The higher value, which will be one higher than the lower value, is a decode of the sum of A52-A54 and B52-B54 with a carry bit. Since they are only one apart, one decoded value is certain to be for an odd sum of bits A52-A54 and B53-A54 and the other is certain to be for an even sum. This operation is being carried out while the relatively slower 64-bit adder 1502 is summing A0-A63 and B0-B63. The speed of an adder is generally reduced by increasing the number of bits being added. Thus, although the function being performed by FADec 1504 is more complex than just an add, it is significantly faster than adder 1502 because of the much fewer bits, only three, being decoded.

FADec 1506 operates in the same fashion as FADec 1504 except with bits A55-A57 and B55-B57 as the inputs. Thus, FADec provides one of four even outputs 1524 in an active state and one of four odd outputs 1526 in an active state. The two active lines are the decode of the sum of A55-A57 and B55-B57 with and without a carry bit, which are the only two possibilities.

Decoder 1508 responds to the active signals of bits 1520, 1522, 1524, and 1526 by providing one active wordline signal for each of arrays 1510, 1512, 1514, and 1516. The logical combination of even bits 1520 and 1524 determine the selected wordline for array 1510. The logical combination of even bits 1520 and odd bits 1526 determine the selected wordline for array 1512. The logical combination of odd bits 1522 and even bits 1524 determine the selected wordline for array 1514. The logical combination of odd bits 1522 and odd bits 1526 determine the selected wordline for array 1516. Decoder 1508 functions also as a wordline driver. The 16 lines coming into each array 1510, 1512, 1514, and 1516 are effectively wordlines but not showing the memory cells connected to them which are in the arrays. This function of decoder 1508 occurs while adder 1502 continues to complete the summing function. Arrays 1510, 1512, 1514, and 1516 respond to the wordline activation by providing an output, which is 36 bits, to multiplexer 1518. Adder 1502 by this time has calculated the sum and provides the result for bits 54 and 57 to multiplexer 1518. These two bits are sufficient to determine which of arrays 1510, 1512, 1514, and 1516 has the data corresponding to the correct address. If bit 54 is a one then the activated line of odd bits 1522 is the valid line. On the other hand, if bit 54 is a zero, then the activated line of even bits 1520 is the valid line. Similarly, if bit 57 is a one then the activated line of odd bits 1526 is the valid line. On the other hand, if bit 57 is a zero, then the activated line of even bits 1524 is the valid line. Multiplexer 1518 thus functions to select which of arrays 1510, 1512, 1514, and 1516 provides the output as the TAG output of TAG memory 1500.

Figure 16:
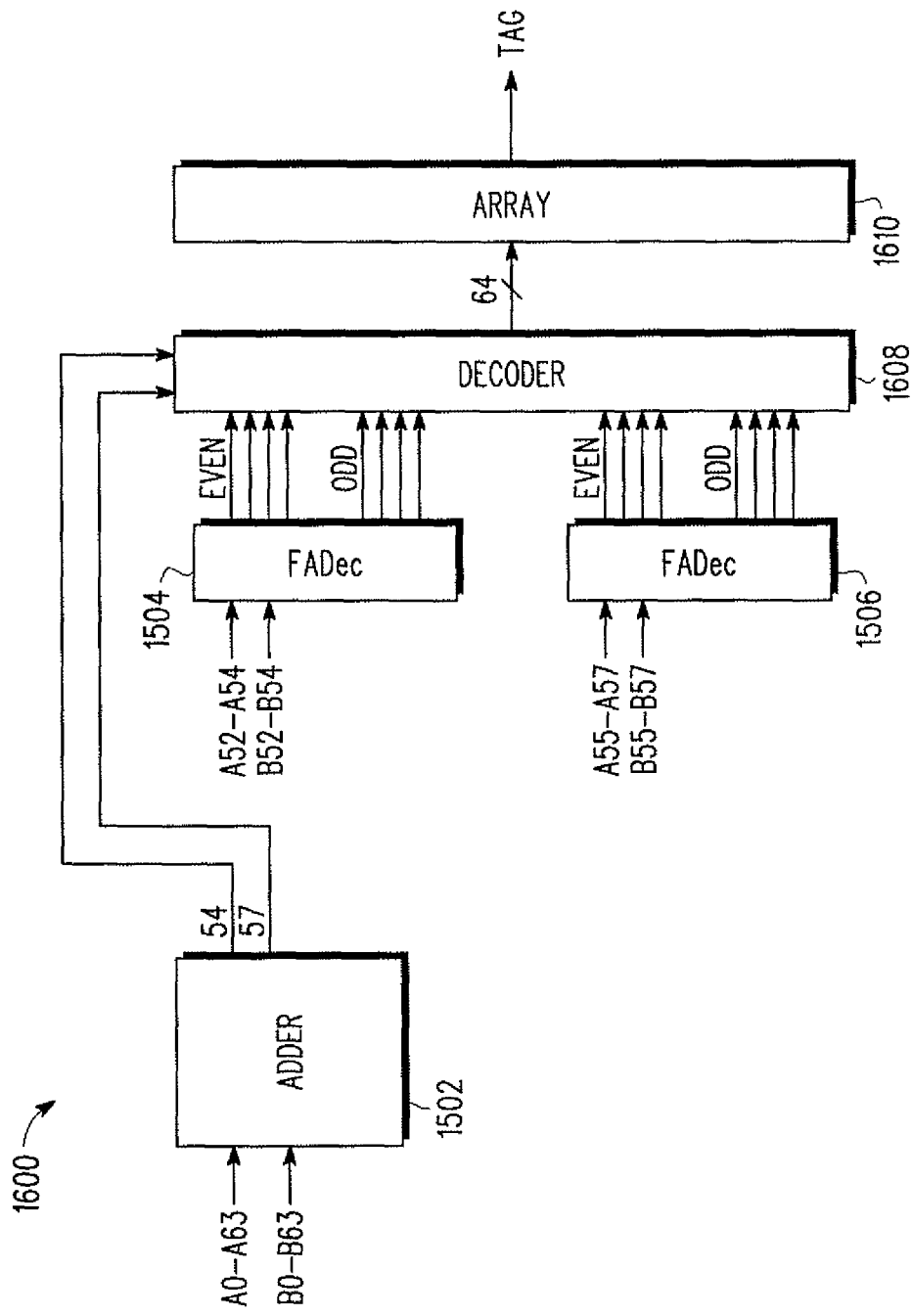
FIG. 16 is a block diagram of another alternative embodiment.

Shown in FIG. 16 is an alternative TAG memory 1600. This is similar to TAG memory 1500 with a decoder 1608 replacing decoder 1508, a single memory array replacing arrays 1510, 1512, 1514, and 1516, and no multiplexer. In this case, the outputs that are bits 54 and 57 from adder 1502 are coupled to decoder 1608. In this case, bits 54 and 57 provide the information as to the correct answer for the sum of A0-A63 and B0-B63 to decoder 1608 so that decoder 1608 can select the correct word line of array 1610. This may be advantageous in the case where the summing of adder 1502 can occur quickly enough so that decoder 1608 can make the selection of the word line quickly enough for the desired operation. This is likely to be slower than the example shown in FIG. 15 but may be fast enough for some applications.

Another possibility is to select value in one FADecs 1504 and 1506. This would be even a little slower than the example shown in FIG. 16 but also may be fast enough for some applications.

Various other changes and modifications to the embodiments herein chosen for purposes of illustration will readily occur to those skilled in the art. For example, specific numbers of bits were described but other numbers could be used. Examples were described to aid in understanding. It was not intended that these examples were the only examples. To the extent that such modifications and variations do not depart from the spirit of the invention, they are intended to be included within the scope thereof which is assessed only by a fair interpretation of the following claims.

What is claimed is:

1. A method of operating a memory having a wordline driver, a first array, a second array, a third array, and a fourth array, comprising:
    summing a first set of bits of a first operand and a corresponding set of bits of a second operand to obtain a pair of selection bits;
    providing a first plurality of bits of the first operand;
    providing a second plurality of bits of the second operand;
    providing a third plurality of bits of the first operand;
    providing a fourth plurality of bits of the second operand;
    decoding a value that is based on the first plurality of bits and the second plurality of bits to provide a first decoded value to the wordline driver;
    decoding a value that is based on the first plurality of bits and the second plurality of bits to provide a second decoded value to the wordline driver;
    decoding a value that is based on the third plurality of bits and the fourth plurality of bits to provide a third decoded value to the wordline driver;
    decoding a value that is based on the third plurality of bits and the fourth plurality of bits to provide a fourth decoded value to the wordline driver;
    using the wordline driver to enable a wordline of the first array selected by the first and third decoded values, a wordline of the second array selected by the first and fourth decoded values, a wordline of the third array selected by the second and third decoded values, and a wordline of the fourth array selected by the second and fourth decoded values; and
    using the pair of selection bits to select one of the first, second, third, and fourth arrays for providing an output corresponding to the sum of the first set of bits and the corresponding set of bits.

2. The method of claim 1, wherein the memory is characterized as a cache, the method further comprising providing the output as a TAG value from a TAG array of the cache.

3. The method of claim 1, the step of summing the first set of bits of the first operand and the corresponding bits of the second operand is performed concurrently with the steps of decoding to provide the first, second, third, and fourth decoded values.

4. A data processing system for providing a TAG having a memory comprising a wordline driver, a first array, a second array, a third array, and a fourth array, comprising:
    an adder that adds a first plurality of bits that comprise a subset of a first operand to a second plurality of bits that comprise a subset of a second operand and provides a selection set of bits that is fewer in number than the first plurality of bits;
    a first decoder coupled to receive a first set of bits that is a subset of the first plurality of bits and a second set of bits that is a subset of the second plurality of bits, and coupled to provide a first decoded value based on the first set of bits and the second set of bits and a second decoded value based on the first set of bits and the second set of bits; and
    a second decoder coupled to receive a third set of bits of that is a subset of the first plurality of bits and a fourth set of bits that is a subset of the second plurality of bits, and coupled to provide a third decoded value based on the third set of bits and the fourth set of bits and a fourth decoded value based on the third set of bits and the fourth set of bits; and
    a multiplexer coupled to the first, second, third, and fourth arrays and receives the selection set of bits;
    wherein:
        the wordline driver is coupled to receive the first decoded value, the second decoded value, the third decoded value, and the fourth decoded value, and coupled to enable one wordline of each of the first, second, third, and fourth arrays; and
        the multiplexer selects one of the first, second, third, and fourth arrays for providing the TAG.

5. The data processing system of claim 4, wherein the adder adds the first plurality of bits to the second plurality of bits and provides the selection set of bits concurrently with the first and second decoders providing the first, second, third, and fourth decoded values and the wordline driver enabling one wordline of each of the first, second, third, and fourth arrays.

6. The data processing system of claim 5, wherein the multiplexer selects the one wordline of the first array based on the first decoded value and the third decoded value, the one wordline of the second array based on the first decoded value and the fourth decoded value, the one wordline of the third array based on the second decoded value and the third decoded value, and the one wordline of the fourth array based on the second decoded value and the fourth decoded value.

* * * * *